J. F. PRICE.
MILK COOLER.
APPLICATION FILED MAR. 16, 1910.
980,833.
Patented Jan. 3, 1911.
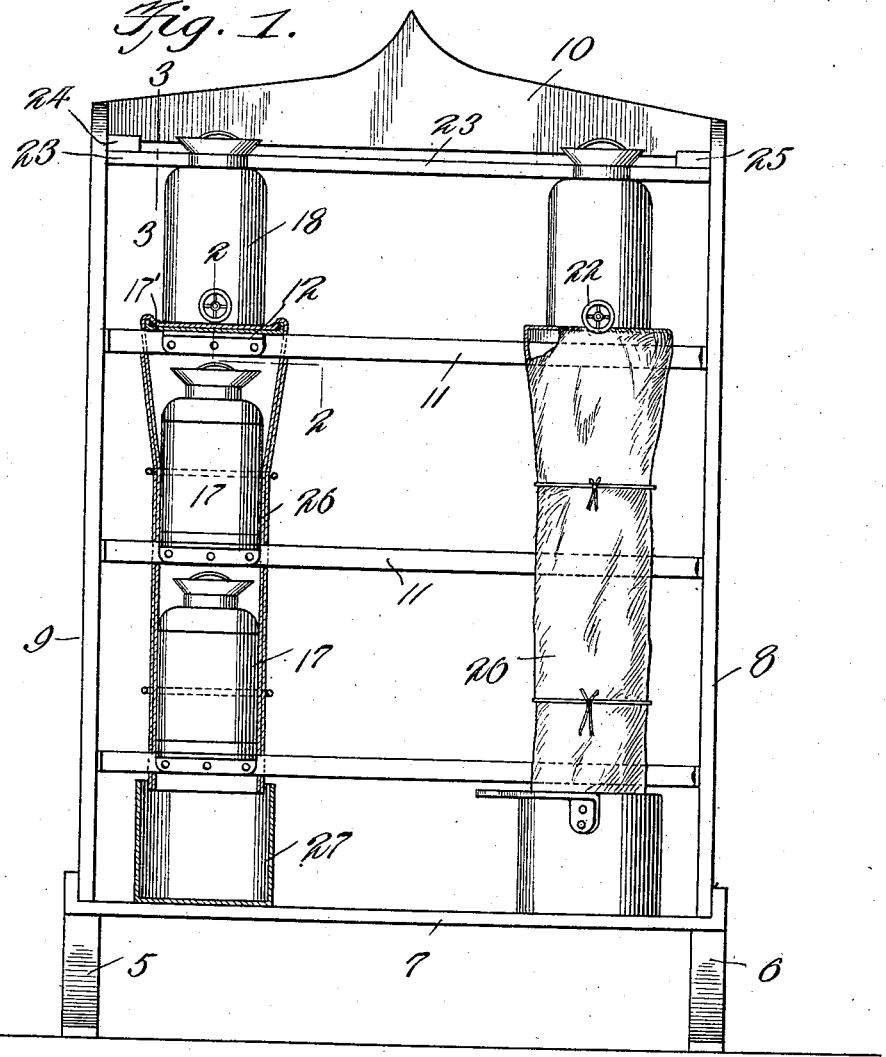
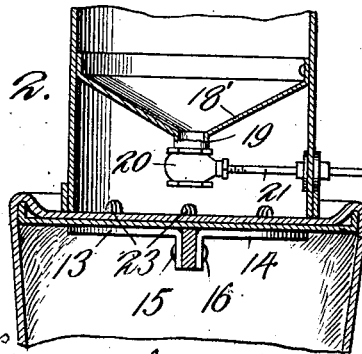
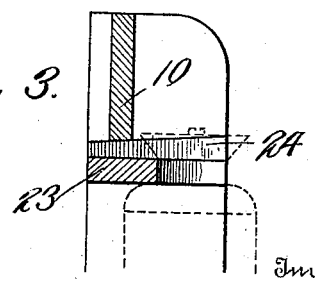
Inventor
Jessee F. Price
By Victor J. Evans
Attorney

UNITED STATES PATENT OFFICE.

JESSEE F. PRICE, OF TECUMSEH, OKLAHOMA, ASSIGNOR OF ONE-FOURTH TO HARRY H. WILSON AND ONE-FOURTH TO WILLIAM M. GALLAGHER, OF TECUMSEH, OKLAHOMA.

MILK-COOLER.

980,833. Specification of Letters Patent. Patented Jan. 3, 1911.

Application filed March 16, 1910. Serial No. 549,778.

*To all whom it may concern:*

Be it known that I, JESSEE F. PRICE, a citizen of the United States, residing at Tecumseh, in the county of Pottawatomie and State of Oklahoma, have invented new and useful Improvements in Milk-Coolers, of which the following is a specification.

This invention relates to improvements in milk coolers and has for its object the provision of a device of that kind wherein the milk in a number of receptacles may be preserved in a cool state by the action of cool water percolating through a fabric sheath surrounding the receptacles.
Another object is the provision of an improved form of support for the milk receptacles.

A further object is the provision of a reservoir having a valve-controlled outlet opening for controlling the flow of water to the sheath.

With these and other objects in view, which will more fully hereinafter appear, the present invention consists in certain novel details of construction and arrangement of parts, hereinafter fully described, illustrated in the accompanying drawings and more particularly pointed out in the appended claim, it being understood that various changes in the form, proportion, size and minor details of the device may be made within the scope of the appended claim without departing from the spirit or sacrificing any of the advantages of the invention.
In the accompanying drawings, forming a part of the specification:—Figure 1 is a front elevation of the device. Fig. 2 is a vertical, sectional view on the line 2—2 of Fig. 1. Fig. 3 is a sectional end elevation on the line 3—3 of Fig. 1.

Similar numerals of reference are employed to designate corresponding parts throughout.

The support includes in its construction a pair of legs designated by the numerals 5 and 6. Fixedly secured to the upper ends of these legs and maintaining the same in spaced relation is an oblong bottom 7. Rising from the opposite ends of the bottom 7 are the side walls 8 and 9, the upper ends of which are connected by a stringer 10.

Arranged between the side walls 8 and 9 are a plurality of cross pieces 11. These members are preferably formed of metal and have their opposite ends secured to the medial lines of the side walls 8 and 9. The space between the cross pieces 11 will be somewhat greater than the height of the ordinary milk can whereby a milk can may be inserted into the spaces between the cross pieces. Fixedly secured to the opposite end portions of the cross pieces are circular platforms 12. These members are preferably formed of metal and each consists of a pair of semi-circular sections designated by the numerals 13 and 14, the straight sides of which are bent at right angles, as shown at 15, and clamped to the opposite face of the cross piece by bolts or rivets 16, as clearly shown in Fig. 2. These platforms are designed to support the milk receptacles 17, as clearly shown in Fig. 1. In the construction illustrated in the drawings, three cross pieces are employed and support four milk buckets. It must be understood, however, that I am not to be limited to this arrangement since it will be understood from what will appear latter, that a greater or less number of milk buckets might be supported by increasing or diminishing the number of cross pieces, without departing from the spirit of the invention.

What will subsequently be termed a container is designated by the numeral 17'. In the present instance, two of these containers are employed and are fixedly secured to the platform 12 carried by the upper cross piece 11. The containers are preferably of metal and are dished as clearly illustrated in Fig. 1 and are somewhat greater in diameter than the diameters of the platforms 12.

What will subsequently be termed a reservoir is designated in general by the numeral 18. This member conforms to the shape of an ordinary milk receptacle and, as shown in Fig. 2, is at a point adjacent to its lower end provided with an inclined bottom 18'. The bottom 18' is an inverted frusto-conical structure, or substantially so, and its center is provided with a nipple 19 into which is threaded a valve 20. The valve 20 is provided with a stem 21 which extends through the wall of the reservoir and at its outer end is provided with a hand wheel 22. The lower end of the valve 20 extends to a point adjacent the lower end of the reservoir, and formed in the said lower end portion of the reservoir and directly beneath the valve are a plurality of circular perforations 23. The diameter of the reservoir will be approximately that of the ordinary milk bucket so that when it is placed upon one of the containers, as shown in Fig. 1, the vertical side of said container will be spaced from the outer surface of the reservoir.

The reservoirs are held within the containers by means of a strip 23, corresponding in length to the distance between the side walls 8 and 9. The strip 23 is provided adjacent its opposite ends with a pair of semi-circular depressions which receive the necks of the reservoirs when two or more of the latter are employed. The strip 23 is clamped in position by means of a pair of wedges 24 and 25, the ends of which are insertible into the space between the lower side of the stringer 10 and strip 23, as clearly shown in Figs. 1 and 3.

The fabric sheath is designated by the numeral 26 and is preferably of two sections. The sheath will be of a length sufficient to extend from the lower ends of the reservoirs 18 to the bottom 7 of the support or substantially so. In positioning the sheath, the upper end portions of each section are placed over the container 17 after which the reservoir is placed upon the container whereby the upper ends are clamped between the container and reservoir and held against displacement. When the said upper ends are so positioned cords are passed around the body sections and at points at the middle on the milk receptacles whereby the sections are held surrounding the said milk receptacles.

The drip pans are designated by the numeral 27 and are supported by the bottom 7 and directly beneath the milk receptacles 17. These drip pans receive the lower ends of the sheaths and catch the water after it passes through the said sheaths.

In the operation of the device, the milk receptacles are placed upon the platforms 12, after which the upper end of the sheath is secured to the container in the manner before described, after which the reservoirs are secured in position as before stated. When the lower ends of the sheaths are within the drip pans and the sections of the sheaths secured by the cords and the reservoir filled with water, the valve 20 is then opened by means of the hand wheel 22 whereby water is permitted to flow into the container through the perforations 23 at the lower end of the reservoir. When the water enters the container it will immediately saturate the sheaths and pass downwardly into the drip pans. By the provision of the valve a predetermined quantity of water may be permitted to flow into the container so that the water level in the latter may be kept at the same level continuously, that is to say, the amount of water passing through the valve 20 may be so regulated that it will correspond to the amount of water absorbed by the sheath.

With this construction, it is evident that I have provided a device wherein the operation of keeping a quantity of milk in a cool state is performed in a simple and expeditious manner and it will be further observed that the device is exceedingly simple in structure and inexpensive in manufacture, embodying few parts and these so arranged that the danger of derangement will be reduced to a minimum.

Having thus described the invention, what is claimed, is:—

In a milk cooler, the combination with a milk receptacle and a support; of a dished container secured to the support and arranged above the milk receptacle, a reservoir interiorly provided with an inverted frusto-conical bottom, and a valve arranged at the central portion of said bottom, said reservoir being further provided at points below the valve with a plurality of perforations, a fabric sheath insertible between the container and reservoir and surrounding the milk receptacle.

In testimony whereof I affix my signature in presence of two witnesses.

JESSEE F. PRICE.

Witnesses:
 HAL JOHNSON,
 JERIE MARTIN.